Feb. 6, 1951 J. H. KNAPP 2,540,891
JUICER FOR FRUIT HALVES HAVING MEANS FOR
INVERTING THE SIDES OF THE HALVES
Filed July 22, 1946 2 Sheets-Sheet 1
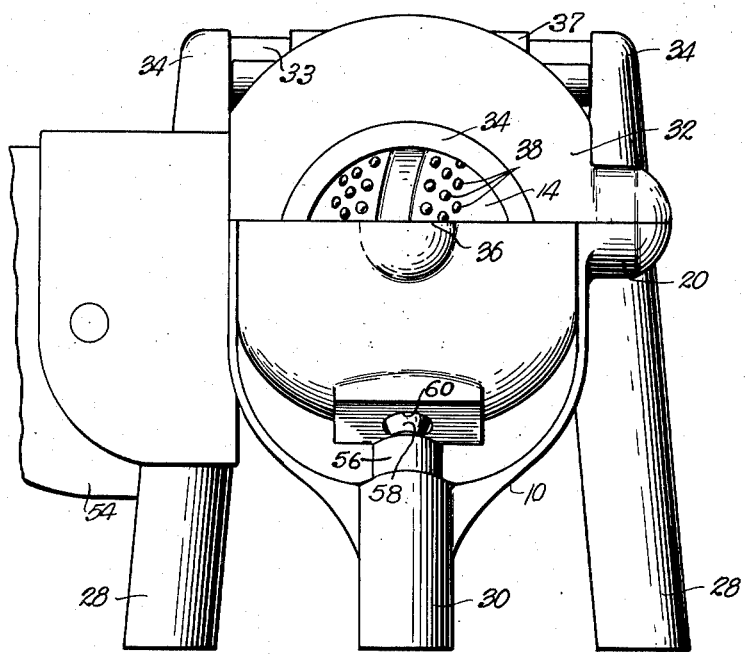
Fig. 1.
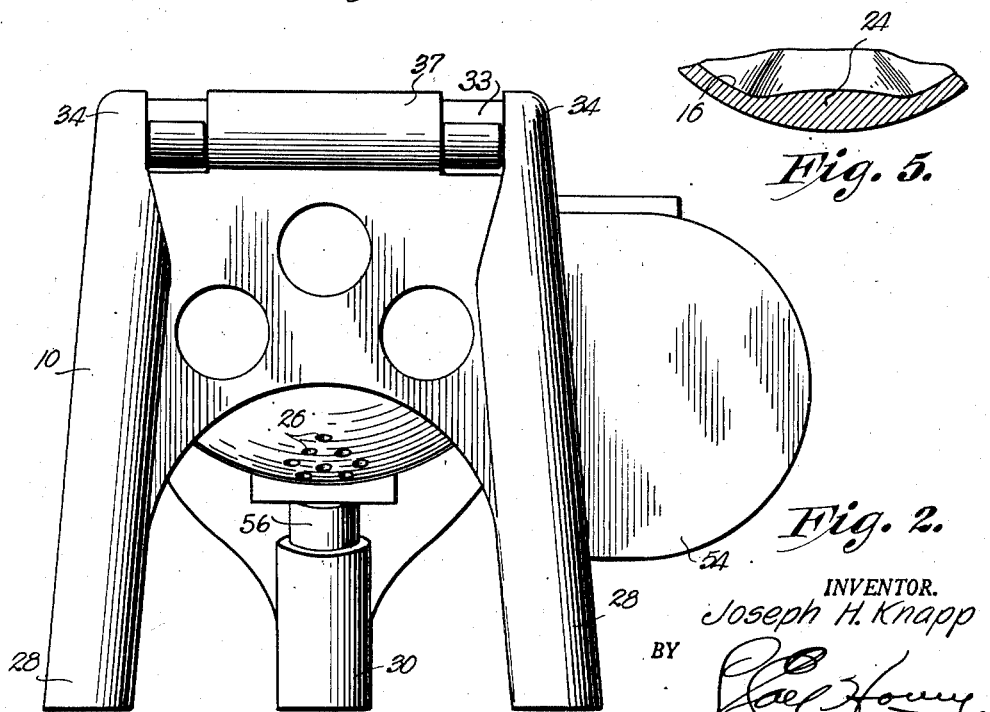
Fig. 5.
Fig. 2.
INVENTOR.
Joseph H. Knapp
BY
ATTORNEY.

INVENTOR.
Joseph H. Knapp
BY
ATTORNEY.

Patented Feb. 6, 1951

2,540,891

UNITED STATES PATENT OFFICE 2,540,891

JUICER FOR FRUIT HALVES HAVING MEANS FOR INVERTING THE SIDES OF THE HALVES

Joseph H. Knapp, Kansas City, Mo., assignor, by direct and mesne assignments, to C. Earl Hovey, Kansas City, Mo., trustee Application July 22, 1946, Serial No. 685,464

2 Claims. (Cl. 146—3)

This invention relates to citrus fruit juicers of the character that may be employed domestically or commercially at soda fountains, restaurants or the like where the juice of citrus fruits is to be removed and served without storing and the primary aim of the invention is to provide a mechanical juicer of the aforesaid character that will be effective in removing all of the juice from the fruit without crushing the peel and thereby causing objectionable traces of peeling oil to permeate the juice which is to be served.

One of the most important objects of this invention is the provision of a juicer of the aforementioned type wherein a fruit half may be treated and passed along a specially contoured surface by a rotor of a form that will cooperate with the said specially contoured surface in reversing the position of the peel as it moves through its path of travel, which reversal insures that the objectionable oil containing portion of the peel is isolated entirely from the parts of the juicer over which the juice is caused to flow.

Further objects of the invention are to provide a juicer wherein a motor driven rotor may be employed to motivate a portion of a citrus fruit over a surface within a cavity that collects the juice to remove all of the juice of the citrus fruit part without rupturing the skin or rind and without removing from the said fruit an objectionable amount of fibrous substance constituting the natural partitioning; to provide a juicer that will be quick in operation and effective in action because of the employment of motor driven means for actuating the rotor; and to provide a juicer that will be sanitary, easily kept clean, attractive in appearance and strong despite its pleasing lines of appearance.

Other aims of the invention will appear during the course of the following specification, referring to the accompanying drawings, wherein:

Fig. 1 is a front plan view of a citrus fruit juicer made in accordance with the present invention.

Fig. 2 is a rear elevational view thereof.

Fig. 5 is a detailed fragmentary sectional view taken on line V—V of Fig. 4.

Figure 3:
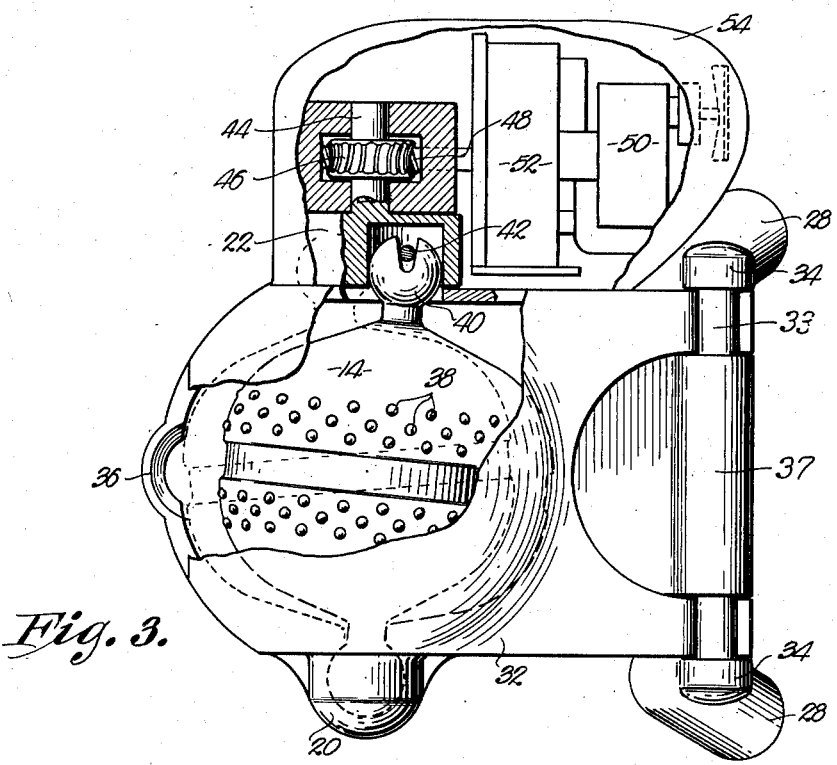
Fig. 3 is a top plan view of the juicer with parts broken away to reveal important structures.

It is well known in the fruit juicing art that such grinding actions as have heretofore taken place in citrus fruit juicers, presents an objectionable result in that certain quantities of the skin oils are squeezed from the rind of the fruit and allowed to mingle with the drinkable juice, and it is also a recognized fact that much of the fibrous material within a citrus fruit is removed therefrom by juicers of the type now available and that such conditions are highly undesirable. Accordingly, therefore, this invention has for its primary aim to provide a citrus fruit juicer that will effectively and positively remove all of the desirable juices from the fruit without mingling therewith any of the oils of the rind and without grinding from within the rind any part of the objectionable fibrous matter.

In the form of the invention chosen for illustration, the numeral 10 designates a body provided with a cavity 12 for receiving the fruit to be juiced and a rotor 14 which is disposed within cavity 12 to act in a manner more fully hereinafter set down.

The cavity 12 is formed in the body 10 so that its inner face 16 is both longitudinally and transversely arched. The inner surface of body 10 forming cavity 12 is, therefore, capable of cooperating with rotor 14, which incidentally is substantially spherical in form, in actually turning inside out the citrus fruit half 18 which is fed into the cavity 12 in the manner illustrated in Fig. 4.

Rotor 14 is pivotally mounted in bearings 20 and 22 on body 10 and the cross-sectional area of cavity 12 progressively decreases as the rotor 14 is approached from the ends of the cavity.

Figure 4:
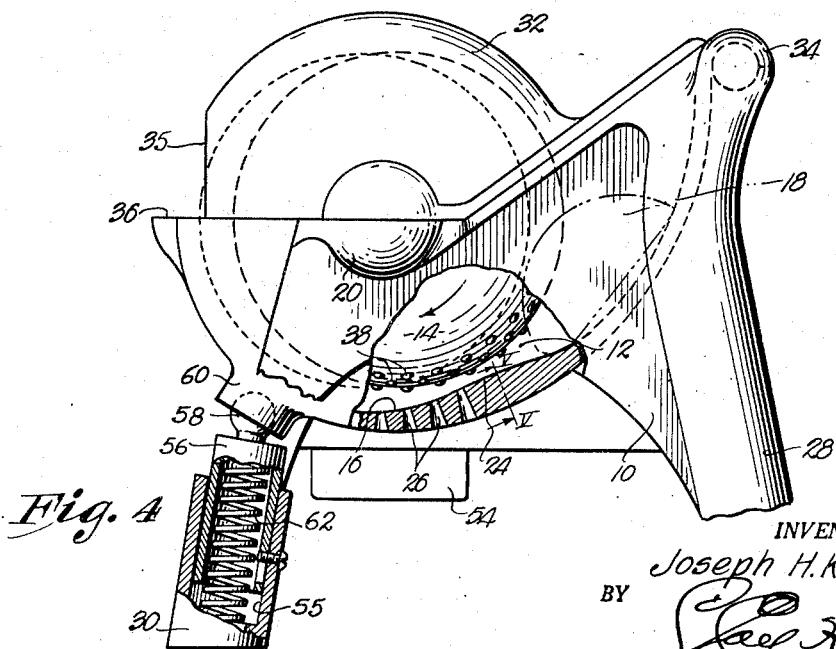
Fig. 4 is a side elevational view with portions of the juicer shown in section.

A hump 24 on body 10 extends upwardly and inwardly toward rotor 14 and is disposed at the point shown in Fig. 4 with respect to the rotor. A number of juice outlet openings or ports 26 are formed through the body 10 and communicate with cavity 12. It is through these openings 26 that the juice is dropped when the machine is in operation. Body 10 is supported by a pair of legs 28 at the end of the juicer where the citrus fruit half 18 is introduced and a leg 30 is disposed at the opposite end of body 10.

A swingable cover 32 is bifurcated and hinged on a shaft 33 that is, in turn, supported by sockets 34 on legs 28 and this cover 32 is formed to completely enclose rotor 14 when the machine is in operation. Body 10 is provided with a loop 37 that is rotatably hooked over the shaft 33. The end of cover 32 opposite to its hinge connection with body 10 is cut away as at 35 to cooperate with lip 36 in allowing the rind or skin of the citrus fruit half 18 to be forced out of the machine by rotor 14 with cover 32 in a closed condition. Rotor 14 has a number of nodules or gripping elements 38 thereon to cooperate with the inner transversely and longitudinally arched surface 16 in drawing the fruit half 18 from one side of rotor 14 to the other.

Rotor 14 has a ball and socket connection at bearing 20 to allow a universal movement while the diametrically opposite side of rotor 14 has a slotted ball 40 engaged by a pin 42 carried in bearing 22. This pin and ball 42 and 40 are eccentric to the axis of rotation of bearing 22 and when the bearing 22 is rotated about the axis of pintle 44, the rotor will revolve about an axis extending between the balls thereof and will be shifted from the position shown in full lines of Fig. 3 to the position shown in dotted lines thereof. As this shifting occurs, the rotor 14 is moved toward and from the surface 16 within cavity 12 and, as illustrated in Fig. 4, when the citrus fruit half 18 is first placed in cavity 12, rotor 14 is in the dotted line position; as the rotor is turned and tipped about its axis of rotation the citrus fruit half 18 is pressed against the surface 16 and caused to arch around the outer periphery of rotor 14 and thereby positively reverse its condition. In so causing the citrus fruit half 18 to reverse its condition, the rotor 14 and transversely arched surface 16 cooperate and as such action occurs, all of the juices of the fruit are forced therefrom. Any oils that may be squeezed from the rind are collected within the cup-shaped reversed half of the fruit 18 and carried from the machine therein.

Bearing 22 is rotated by pinion 46 and worm 48. This worm 48 is connected to a motor 50 through the medium of a suitable speed reducer 52 and the motor speed reducer, bearing and worm and pinion are all confined within a housing 54 carried by body 10.

As shown in Fig. 4, leg 30 is provided with a cavity 55 for slidably receiving a tubular sleeve 56. A ball 58 at the outermost end of sleeve 56 is received by a socket 60 in body 10. A spring 62 in sleeve 56 bears against the bottom of cavity 55 to yieldably hold body 10 biased toward rotor 14, as the operator holds the cover 32 downwardly with his hand.

When the fruit half 18 starts beneath rotor 14, hump 24 enters the central portion of the fruit half 18 to insure that even pressure outwardly or radially from rotor 14 is exerted until the first action of turning the fruit half 18 inside out is completed. It has been found that the double movement on the part of rotor 14, i. e., a rotary movement and a tipping action about the axis of rotation, together with the form of surface 16 within cavity 12 will positively act upon the citrus fruit half 18 to accomplish all of the objects of this invention and while fruit juicers having physical characteristics different from those shown and described may be made, it is believed that these specific elements are salient and important and must be included.

Having thus described my invention, what I claim as new and desire to be secured by Letters Patent is:

1. In a citrus fruit juicer, a body provided with a cavity for receiving the fruit to be juiced; and a rotor in the cavity formed to press the fruit against the surface of the body forming the said cavity and to draw the fruit over the said surface; said rotor having a stationary bearing and an opposed rotating eccentric supporting the same for movement toward and from the said surface as the rotor is rotated.

2. A citrus fruit juicer of the kind described, comprising a body provided with a cavity for receiving the fruit to be juiced; a rotor in the cavity formed to press the fruit against the surface of the body forming the said cavity and to draw the fruit over the said surface; and means to rotate the rotor, said rotor having a pair of opposed shafts supporting the same, and a rotating eccentric on one of said shafts for revolving the rotor through a circular path of travel on the other shaft as the rotor is rotated.

JOSEPH H. KNAPP.

REFERENCES CITED

The following references are of record in the file of this patent:

UNITED STATES PATENTS

| Number | Name | Date |
|---|---|---|
| 785,727 | Gilchrist | Mar. 28, 1905 |
| 1,241,307 | Tompkins | Sept. 25, 1917 |
| 1,600,882 | Jacobson | Sept. 21, 1926 |
| 1,966,978 | Estrada et al. | July 17, 1934 |
| 1,970,274 | Brown | Aug. 14, 1934 |
| 1,998,705 | Bradley et al. | Apr. 23, 1935 |
| 2,212,925 | Polk, Sr. et al. | Aug. 27, 1940 |
| 2,222,791 | Wentorf | Nov. 26, 1940 |

FOREIGN PATENTS

| Number | Country | Date |
|---|---|---|
| 29,618 | Germany | Dec. 1, 1884 |